(12) United States Patent
Chen et al.

(10) Patent No.: US 7,530,713 B2
(45) Date of Patent: May 12, 2009

(54) LIGHT-REFLECTING AND LIGHT-SHIELDING APPARATUS OF COMPUTER PANEL

(75) Inventors: Yun-Lung Chen, Shenzhen (CN); Yu-Ming Xiao, Shenzhen (CN); Xian-Huang Gao, Shenzhen (CN); Jian Hu, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 41 days.

(21) Appl. No.: 11/308,821

(22) Filed: May 11, 2006

(65) Prior Publication Data
US 2007/0153529 A1    Jul. 5, 2007

(30) Foreign Application Priority Data
Dec. 30, 2005    (CN)    ............ 2005 2 0121448 U

(51) Int. Cl.
*F21S 8/00*    (2006.01)
*F21V 7/00*    (2006.01)
*F21V 11/00*    (2006.01)

(52) U.S. Cl. .............. 362/277; 362/296; 362/341; 362/351

(58) Field of Classification Search .......... 362/351, 362/362, 367, 368, 375, 341, 346, 353, 555, 362/800, 303, 125, 512, 277, 280, 319, 321, 362/492, 92, 128, 135, 136, 137, 551, 552, 362/581, 296, 297, 227, 310, 347; 340/815.75, 340/815.76, 815.55, 815.4; 116/202, 323, 116/324
See application file for complete search history.

(56) References Cited

U.S. PATENT DOCUMENTS

| | | | | | |
|---|---|---|---|---|---|
| 1,834,542 | A | * | 12/1931 | Birger | ............ 362/281 |
| 2,641,857 | A | * | 6/1953 | Pedersen et al. | ............ 116/222 |
| 4,019,044 | A | * | 4/1977 | Kelly et al. | ............ 362/307 |
| 4,412,276 | A | * | 10/1983 | Blinow | ............ 362/278 |
| 4,570,205 | A | * | 2/1986 | Shiojiri | ............ 362/18 |
| 6,824,290 | B2 | * | 11/2004 | Noda et al. | ............ 362/155 |

FOREIGN PATENT DOCUMENTS

TW    092219937    10/2004

* cited by examiner

*Primary Examiner*—Jong-Suk (James) Lee
*Assistant Examiner*—David R Crowe
(74) *Attorney, Agent, or Firm*—Wei Te Chung

(57) ABSTRACT

A panel assembly for reflecting and shielding rays of a light source, includes a panel, a light-reflecting member attached to the panel, and a light-shielding board received in the light-reflecting member. The panel includes a base and a bent plate perpendicular to the base. A light-pervious board is disposed on the panel. The light-reflecting member defines an opening opposite to the light pervious mechanism, for reflecting some rays on the light-pervious mechanism through the opening. Wherein the light-shielding board is manipulated to move along a direction vertical to the light-reflecting member. When the light-shielding board is positioned in an upper position, the opening of the light-reflecting member is exposed to allow rays through the light-pervious board. When the light-shielding board is positioned in a lower position, the opening of the light-reflecting member is covered, and no rays are reflected to the light-pervious board.

19 Claims, 5 Drawing Sheets

US 7,530,713 B2

LIGHT-REFLECTING AND LIGHT-SHIELDING APPARATUS OF COMPUTER PANEL

FIELD OF THE INVENTION

The present invention relates to front panels of computer systems, and more particularly to a front panel of a computer system with a light-reflecting and light-shielding member.

DESCRIPTION OF RELATED ART

Usually, a light source, such as a light-emitting diode, is installed on a front panel of a computer system, in order to display the working state of the computer system. Generally, a light-pervious switch button is positioned on the front panel. When the switch button is pushed to press an electrical switch, the power supply switches on and the light source emits light, and the switch button is illuminated. However, in conventional computer systems, one light source corresponds to only one switch button. If another switch button or light-pervious member needs illumination, additional light-emitting diodes should be provided. In addition, the light-emitting diode as a spot light source, lights only a limited area.

Another conventional apparatus is provided for illuminating more light-pervious members and enlarging the lit area of the light source, which includes an arcuate flat light-reflecting member mounted on a computer panel. The light-reflecting member includes a light incident surface, a light-guiding portion, and a light-showing portion. A bracket is disposed above the light incident surface for receiving a light source. Rays emitted by the light source are reflected by the light-guiding portion, and illuminate a larger area of the computer panel via the light-showing portion. However, the light of the computer panel cannot be shielded when users don't want to see the light while the computer is running.

What is needed, therefore, is a front panel of a computer system with a light-reflecting and light-shielding apparatus allowing a larger area of the computer panel to be lit and also shield the light when so desired.

SUMMARY OF INVENTION

A panel assembly for reflecting or shielding rays of a light source, includes a panel, a light-reflecting member attached to the panel, and a light-shielding board received in the light-reflecting member. The panel includes a base and a bent plate perpendicular to the base. A light-pervious board is disposed on the panel. The light-reflecting member defines an opening opposite to the light pervious mechanism, for reflecting some rays on the light-pervious mechanism through the opening. Wherein the light-shielding board is manipulated to move along a direction vertical to the light-reflecting member. When the light-shielding board is positioned in an upper position, the opening of the light-reflecting member is exposed to allow rays through the light-pervious board. When the light-shielding board is positioned in a lower position, the opening of the light-reflecting member is closed, and no rays are reflected to the light-pervious board.

Other advantages and novel features will be drawn from the following detailed description of preferred embodiments with attached drawings, in which:

DETAILED DESCRIPTION

Figure 1:
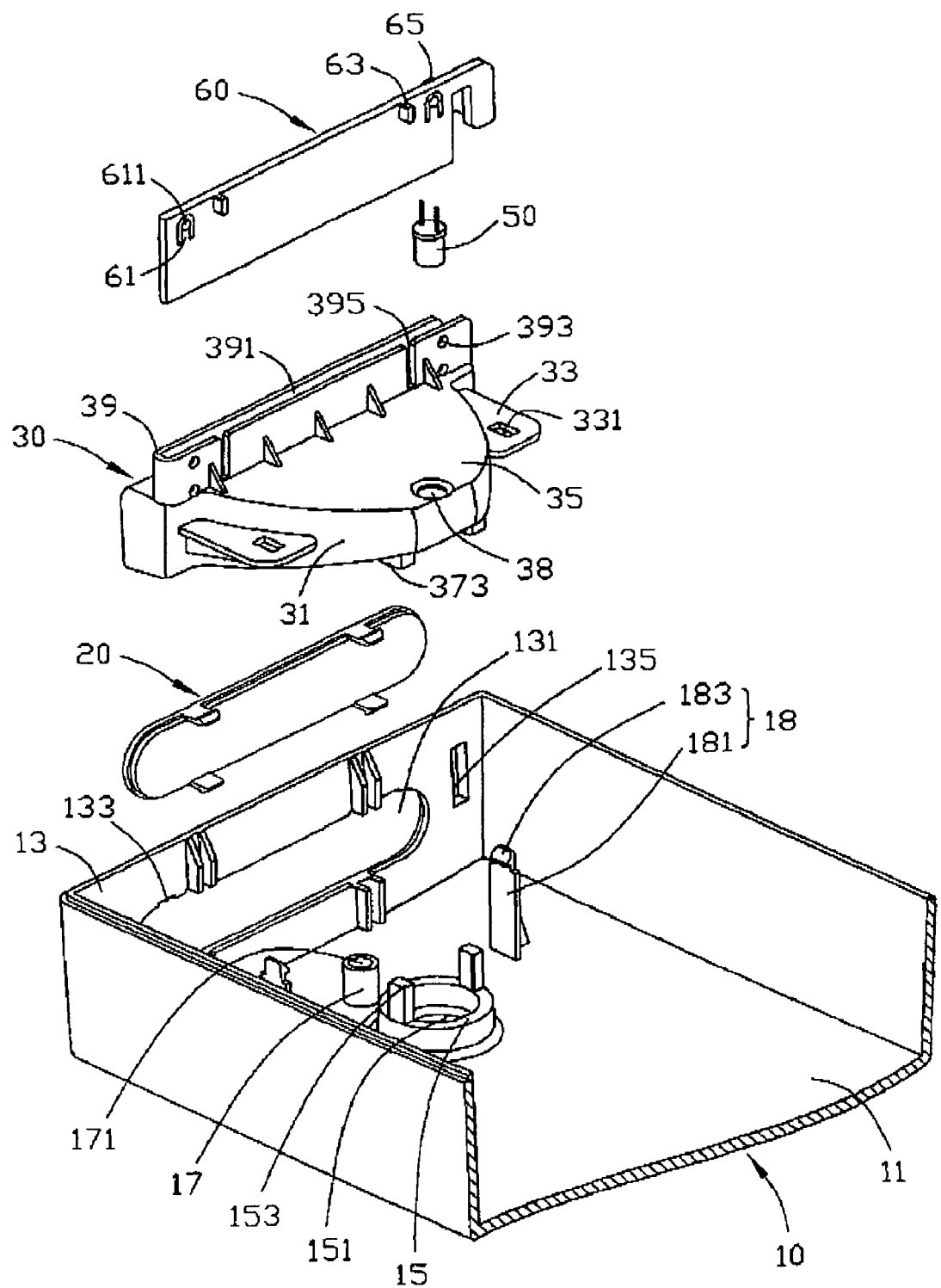
FIG. 1 is an exploded, isometric view of a panel with a light-reflecting and light-shielding apparatus in accordance with a preferred embodiment of the present invention, including a panel, a light-reflecting member, a light-shielding board, and a light source.

Referring to FIG. 1, a light reflecting and shielding apparatus in accordance with a preferred embodiment of the present invention, includes a computer panel 10, a light-reflecting member 30, and a light-shielding board 60.

The computer panel 10 includes a base 11, and a bent plate 13 generally perpendicular to the base 11. A round protuberance 15 protrudes from the inner surface of the base 11. A receiving hole 151 is defined in the center of the protuberance 15, for a light-pervious button (not shown) disposed therein. Two projecting blocks 153 are respectively formed at opposite sides of the protuberance 15. A pair of elongated hooks 18 protrudes from the base 11 between the bent plate 13 and the protuberance 15. Each elongated hook 18 includes a supporting pole 181 and a clasp 183 protruding from a free end of the supporting pole 181. A positioning post 17 with a positioning hole 171 defined therein protrudes from the base 11 between the pair of elongated hooks 18. A generally elliptic through opening 131 is horizontally defined in the bent plate 13. A pair of notches 133 is defined at an upper edge of the opening 131. A light-pervious mechanism, such as a generally elliptic transparent board 20, is fitted into the through opening 131. A rectangular slot 135 is defined in the bent plate 13 at a side of the opening 131.

Figure 2:
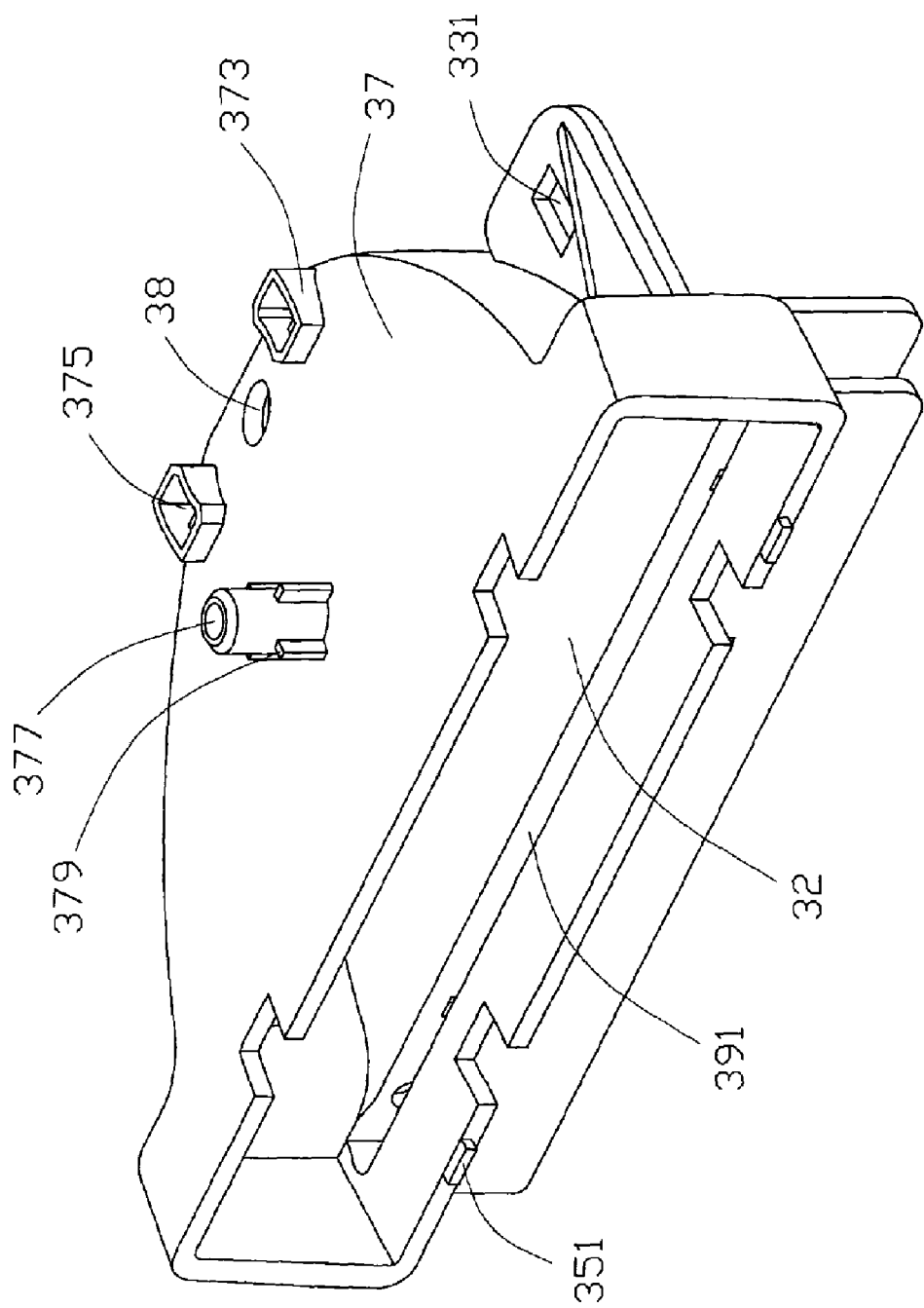
FIG. 2 is an enlarged isometric view of the light-reflecting member of FIG. 1, but viewed from another aspect.

Referring to FIGS. 1 and 2, a light-reflecting member 30 is configured to be disposed on an inner surface of the computer panel 10, for reflecting rays of a light source 50, and enlarging an illuminated area. The light source 50 may, for example, be a light-emitting diode. The light-reflecting member 30 has a hollow body, a semicircular top wall 35, a semicircular bottom wall 37 parallel to the top wall 35, and a generally embowed sidewall 31 integrated with them. A generally rectangular through opening 32 for light passing through, is defined by adjacent edges of the top wall 35, the bottom wall 37, and the sidewall 31. A pair of securing tabs 351 protrudes forward from the edge of the top wall 35, for engaging in the notches 133 of the bent plate 13. A pair of extending clips 33 protrudes from the sidewall 31 at opposite sides respectively. Each extending clip 33 defines a locking hole 331 therein, for receiving the corresponding clasp 183 of the elongated hook 18. A mounting post 377 having a plurality of supporting poles 379 extending therearound, protrudes down from the bottom wall 37 of the light-reflecting member 30, for engaging into the positioning hole 171 of the positioning post 17 of the computer panel 10. A pair of securing portions 373 is formed at the bottom wall 37 of the light-reflecting member 30, and each securing portion 373 defines a securing slot 375 therein, for receiving the corresponding projecting block 153. A through hole 38 is defined at a rear end of the light-reflecting member 30, between the securing portions 373, and through the top wall 35 and the bottom wall 37 thereof, for accommodating the light source 30. A U-shaped folded board 39 extends up from the top wall 35 near to and parallel to the edge of the top wall 35. A receiving slot 391 is defined between two sidewalls of the U-shaped folded board 39, and extends through to the top wall 35. A pair of guiding slots 395 perpendicular to the top wall 35 is defined in one of the sidewalls of the U-shaped folded board 39. A pair of positioning holes 393 is defined at an outside of each guiding slot 395, aligned in a vertical direction.

Figure 3:
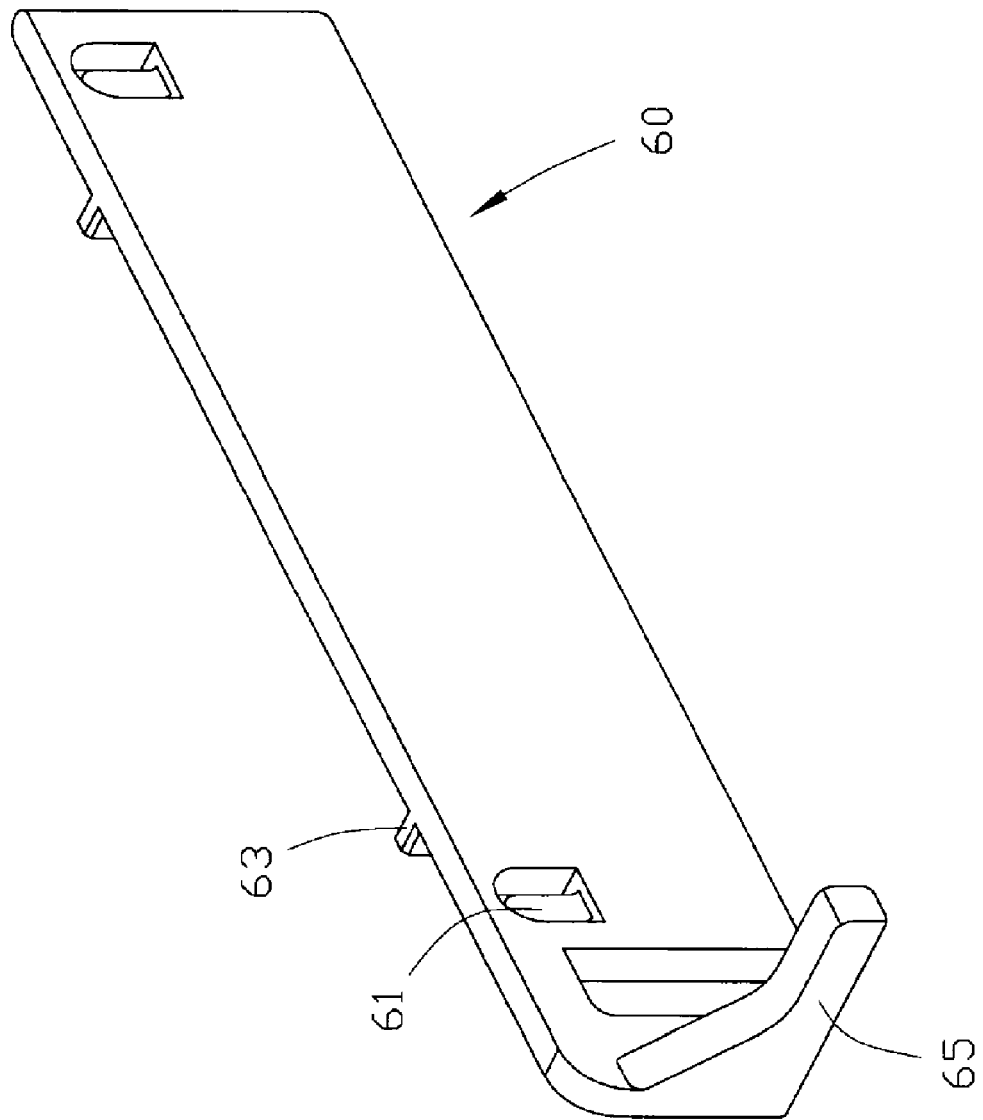
FIG. 3 is an enlarged isometric view of the light-shielding board of FIG. 1, but viewed from another aspect.

Referring also to FIG. 3, the light-shielding board 60 is generally rectangular. A pair of sliding posts 63 protrudes from a top edge of the light-shielding board 60, for sliding in the guiding slots 395 of the U-shaped folded board 39 of the light-reflecting member 30. An elastic positioning member, including a cantilever 61 having a positioning spot 611 protruding at a free end thereof, is respectively formed at an outside of each sliding post 63. An operating handle 65 extends forward from a side edge of the light-shielding board 60, adjacent one of the elastic positioning members, for extending through the slot 135 of the bent plate 13 of the computer panel 10.

Figure 4:
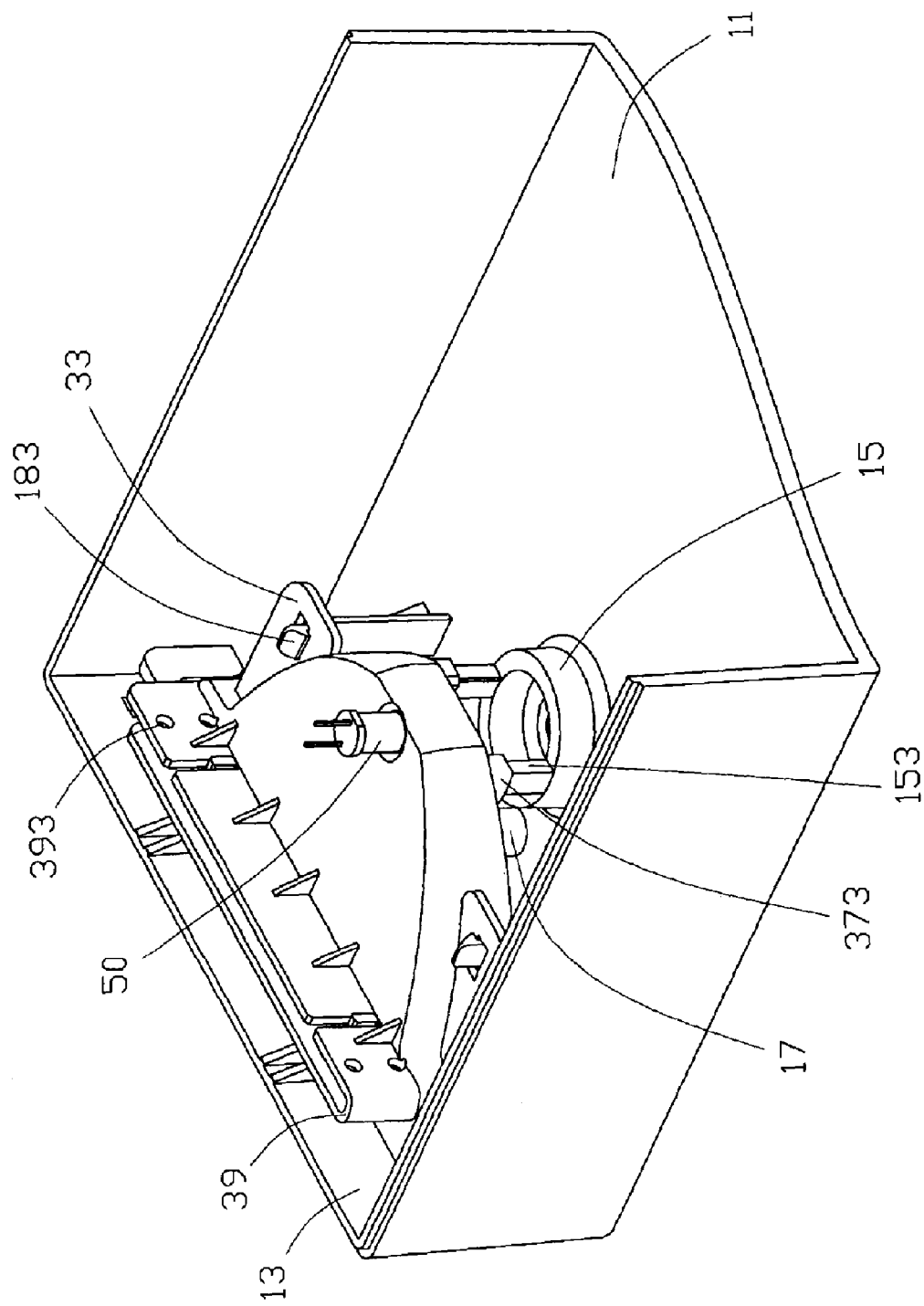
FIG. 4 is an assembled view of the panel with the light-reflecting and light-shielding apparatus of FIG. 1.
Figure 5:
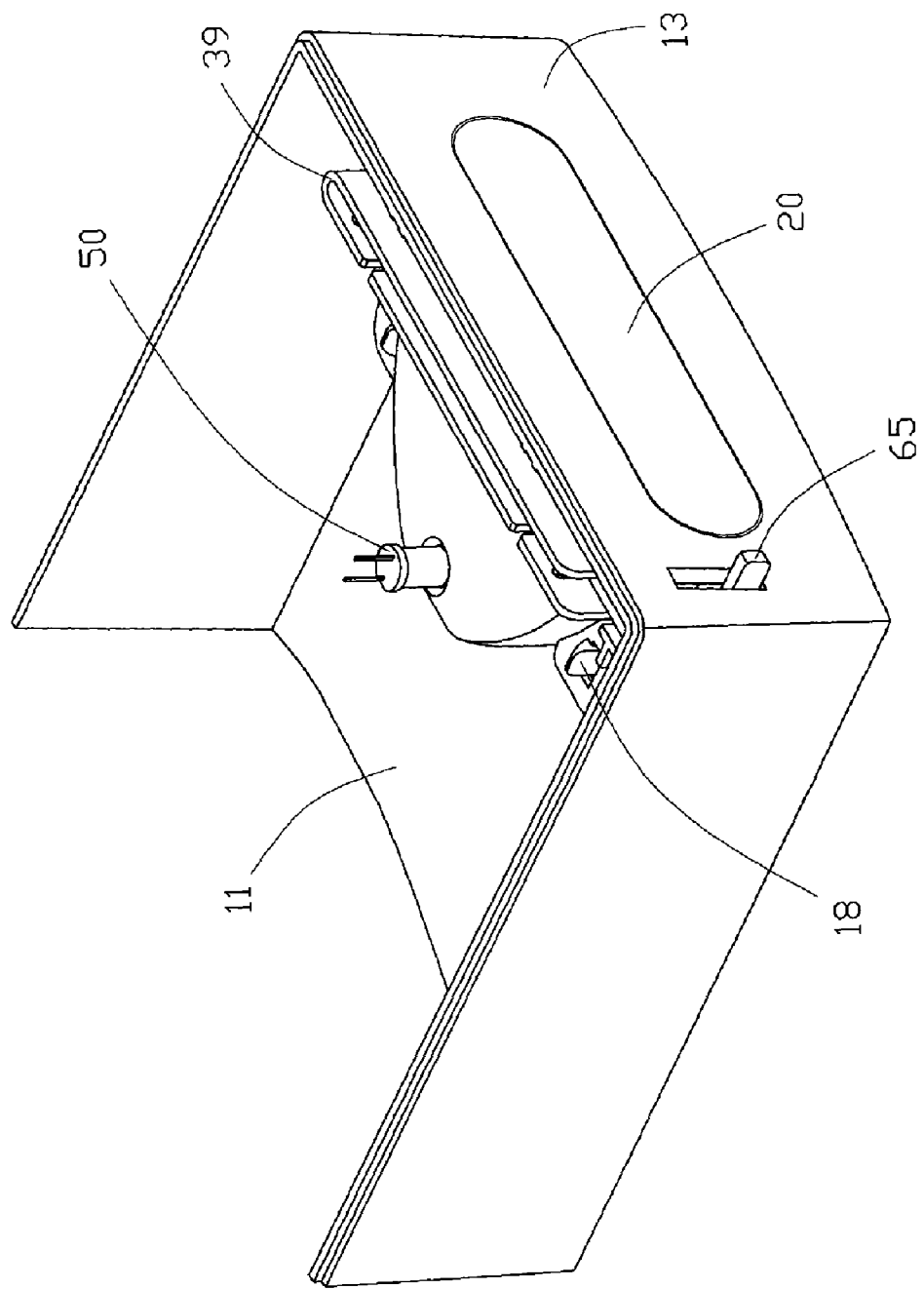
FIG. 5 is an assembled view of the panel with the light-reflecting and light-shielding apparatus of FIG. 1, but viewed from another aspect.

Referring also to FIGS. 4 and 5, in assembly, the securing tabs 351 of the light-reflecting member 30 are inserted into the corresponding notches 133 of the bent plate 13 respectively. The through opening 32 of the light-reflecting member 30 is adjacent to the transparent board 20. Then the light-reflecting member 30 is pushed toward the base 11, until the mounting post 377 and the projecting blocks 153 are respectively inserted into the positioning hole 171 of the positioning post 17 and the securing slots 375 of the securing portions 373. The hook protrusions 183 of the elongated hooks 18 are inserted through the locking holes 331 of the extending clips 33, and engage with the extending clips 33 respectively. The light-reflecting member 30 is thus secured on the computer panel 10. The light source 50 is positioned into the through hole 38, and electrically connects with the computer system for receiving power. The light-shielding board 60 is inserted into the receiving slot 391 of the U-shaped folded board 39. The operating handle 65 extends through the slot 135 of the bent plate 13 of the computer panel 10, thereby exposing it. The sliding posts 63 of the light-shielding board 60 are aligned with the guiding slots 395 of the U-shaped fold board 39 respectively, and are slid toward the top wall 35 of the light-reflecting member 30 along the guiding slots 395. The positioning spots 611 of the elastic securing members snap into the positioning holes 393 of the U-shaped fold board 39 respectively, for positioning the shielding board 60 at a determined position.

In use, when the computer system is started up, the light source 50 emits light. Some rays of the light source 30 shine on the button (not shown) through the through hole 38. If users want the light to illuminate the transparent board 20, the light-shielding board 60 is raised to a position in an upper pair of positioning holes 393 of the U-shaped fold board 39 by raising the operating handle 65. The light-shielding board 60 is received in the receiving slot 391 of the U-shaped fold board 39 of the light-reflecting member 30. The through opening 32 of the light-reflecting member 30 is revealed. Some rays directly irradiate the transparent board 20, and other rays are reflected onto the transparent board 144 by an inner surface of the light-reflecting member 40. Thus, the button and the transparent board 20 are both illuminated, thereby rendering a beautiful effect on the computer panel 10 when the computer system is on. If users don't want the transparent board 20 to be illuminated, the operating handle 65 of the light-shielding board 60 can be pulled down. The light-shielding board 60 moves down along the receiving slot 391, blocking the opening 32 of the light-reflecting member 30. And, the positioning spots 611 snap into a lower pair of positioning holes 393 of the U-shaped fold board 39. Thus, the transparent board 20 is shielded from the light.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A panel assembly comprising:

A panel comprising a base and a bent plate perpendicular to the base, a light-pervious board disposed on the bent plate of the panel; a light sources spaced from said bent plate and facing said light pervious board; a light-reflecting member comprising a top wall, a bottom wall parallel to the top wall, and a generally embowed sidewall connecting the top wall and the bottom wall, an opening opposite to the light-pervious board being defined by edges of the top wall, bottom wall and sidewall, for reflecting some rays from the light source on the light-pervious board through the opening thereof, a folded board having two parallel sidewalls perpendicularly extending up from the top wall of the light-reflecting member and defining a receiving slot; and a light-shielding board, received in the receiving slot of the light-reflecting member, being movable along a direction perpendicular to the top wall of the light-reflecting member, wherein when the light-shielding board is positioned in an upper position, the opening of the light-reflecting member is exposed, and when the light-shielding board is positioned in a lower position, the opening of the light-reflecting member is covered and said light rays are blocked by said light-shielding board.

2. The panel assembly as described in claim 1, wherein the receiving slot is defined between the two parallel sidewalls, and the receiving slot extends through the top wall of the light-reflecting member for the light-shielding board disposed and sliding therein so as to cover or expose the opening of the light-reflecting member.

3. The panel assembly as described in claim 2, wherein the folded board is U-shaped.

4. The panel assembly as described in claim 2, wherein the light-shielding board forms at least an elastic positioning member, and at least a pair of positioning holes aligned in a vertical direction relative to the bottom wall of the light-reflecting member is defined in one of the sidewalls of the folded board of the light-reflecting member, for the elastic positioning member selectively snappingly engaging therein.

5. The panel assembly as described in claim 4, wherein the elastic positioning member comprises a cantilever formed in the light-shielding board, a positioning spot protruding from a free end of the cantilever.

6. The panel assembly as described in claim 2, wherein at least a sliding post protrudes from one of the light-shielding board and the folded board of the light reflecting-member, at least a guiding slot is vertically defined in the other of the light-shielding board and the folded board of the light-reflecting member for the sliding post sliding therein.

7. The panel assembly as described in claim 1, wherein an extending clip defining a securing slot protrudes from opposite sides of the light-reflecting member respectively, and a pair of hooks protrudes from the panel for engaging in the securing slots.

8. The panel assembly as described in claim 1, wherein a slot is defined in the bent plate of the panel adjacent the light-pervious area, and an operating handle extends from one end of the light-shielding member for protruding through the slot.

9. A panel assembly comprising: a panel with a light-pervious area; a light source spaced from said panel and facing said light-pervious area; a light-reflecting member having a front-to-back opening, for reflecting some rays from the light source to the light-pervious area of the panel through the opening, a folded board having two parallel sidewalls perpendicularly extending up from a top surface of the light reflecting member, at least a pair of positioning holes being defined in the folded board along a direction perpendicular to the top surface of the light-reflecting member; and a light-shielding board received in the light reflecting member, the light-shielding board comprising at least an elastic positioning member selectively engaging with the pair of positioning holes, the light-shielding board being movable along a direction vertical to the light-reflecting member, wherein when the positioning member is positioned in the upper positioning hole, the opening of the light-reflecting member is exposed, and when the positioning member is positioned in the lower positioning hole, the opening of the light reflecting member is covered and said light rays are blocked by said light-shielding board.

10. The panel assembly as described in claim 9, wherein a receiving slot is defined in the folded board of the light-reflecting member, for accommodating the light-shielding member.

11. The panel assembly as described in claim 9, wherein the elastic positioning member comprises a cantilever formed in the light-shielding board, a positioning spot protruding from a free end of the cantilever.

12. The panel assembly as described in claim 9, wherein at least a sliding post protrudes from the light-shielding member, at least a guiding slot vertically defined in the board for the sliding post sliding therein.

13. The panel assembly as described in claim 9, wherein a positioning post with a positioning hole is formed on the panel, and a mounting post protrudes from the light-reflecting member for engaging in the positioning hole.

14. The panel assembly as described in claim 9, wherein a slot is defined in the bent plate of the panel adjacent the light-pervious area, and an operating handle extends from one end of the light-shielding member for protruding through the slot.

15. An assembly comprising:
a panel with a light-pervious area;
a light source spaced from said panel and facing said light-pervious area;
a light-reflecting member abutting against said panel besides said light-pervious area to receive said light source therein, said light-reflecting member defining an opening to form a light passing path exclusively toward said light-pervious area when light from said light source is reflected by said light-reflecting member, a folded board comprising two parallel sidewalls perpendicularly extending up from a top wall of said light-reflecting member; and
a light-shielding board disposed between said two parallel sidewalls of said folded board of said light-reflecting member, and being movable between a first position where said opening of said light-reflecting member is exposed so that said light travels toward said light-pervious area along said light passing path, and a second position where said opening of said light-reflecting member is covered and said light passing path is blocked by said light-shielding board.

16. The assembly as described in claim 15, wherein said light-shielding board completely covers said opening when said light-shielding board is in said second position.

17. The assembly as described in claim 15, wherein said light-shielding board forms at least one elastic positioning member, and at least one pair of positioning holes is defined at one of said two sidewalls of said folded board of said light-reflecting member so that said elastic positioning member selectively engages therein.

18. The assembly as described in claim 17, wherein said at least one elastic positioning member comprises a cantilever formed in said light-shielding board, and a positioning spot protruding from a free end of said cantilever.

19. The assembly as described in claim 17, wherein a receiving slot is defined between said two parallel sidewalls of said folded board, and said receiving slot extends trough said top wall of said light-reflecting member for said light-shielding board being disposed and sliding therein so as to cover or expose said opening of said light-reflecting member.

* * * * *